(12) United States Patent
Ziubin (10) Patent No.: US 11,847,043 B2
(45) Date of Patent: Dec. 19, 2023

(54) METHOD AND SYSTEM FOR THE SONIFICATION OF CONTINUOUS INTEGRATION (CI) DATA

(71) Applicant: Micro Focus LLC, Santa Clara, CA (US)

(72) Inventor: Alexander Ziubin, Kiev (UA)

(73) Assignee: Micro Focus LLC, Santa Clara, CA (US)

( * ) Notice: Subject to any disclaimer, the term of this patent is extended or adjusted under 35 U.S.C. 154(b) by 233 days.

(21) Appl. No.: 17/201,930

(22) Filed: Mar. 15, 2021

(65) Prior Publication Data

US 2022/0261334 A1    Aug. 18, 2022

(30) Foreign Application Priority Data

Feb. 17, 2021 (UA) .............................. a 2021 00692

(51) Int. Cl.
*G10L 25/48* (2013.01)
*G06F 11/36* (2006.01)
(Continued)

(52) U.S. Cl.
CPC ........ *G06F 11/3664* (2013.01); *G06F 16/116* (2019.01); *G06F 16/61* (2019.01); *G06F 16/64* (2019.01); *G10L 21/06* (2013.01)

(58) Field of Classification Search
CPC ...... G06F 11/3664; G06F 16/64; G06F 16/61; G06F 16/116; G10L 21/06
See application file for complete search history.

(56) References Cited

U.S. PATENT DOCUMENTS 7,138,575 B2    11/2006   Childs, Jr.
10,037,186 B2    7/2018   Ludwig
(Continued)

OTHER PUBLICATIONS

Takahiko Tsuchiya et al., Data-To-Music API:Real-Time Data-Agnostic Sonification With Musical Structure Model, Jul. 8-10, 2015 [ Retrieved on Jan. 23, 2023]. Retrieved from the internet: < URL: https://smartech.gatech.edu/bitstream/handle/1853/54146/ICAD%20Proceedings%2015-Tsuchiya.pdf> 8 Pages (244-251) (Year: 2015).*

(Continued)

*Primary Examiner* — Anibal Rivera
(74) *Attorney, Agent, or Firm* — Sheridan Ross P.C.

(57) ABSTRACT

A method for the sonification of continuous integration data to audibly represent the health/behavior of builds. The method includes receiving, by a processor, from a build server, continuous integration data for a build job in the continuous integration environment. The method also includes converting, by the processor, the continuous integration data into sonification data. The method further includes applying at least one of toccata, legato, or arpeggio to the sonification data. The method includes generating an audio file from the sonification data; and publishing and/or storing the generated audio file for end users. In some embodiments, the method also includes combining, by the processor, different sets of sonification data, wherein each set of sonification data is associated with a different build job, and wherein each set of sonification data is represented by a different instrument of a plurality of instruments.

20 Claims, 8 Drawing Sheets (51) Int. Cl.
    *G06F 16/11*     (2019.01)
    *G06F 16/64*     (2019.01)
    *G06F 16/61*     (2019.01)
    *G10L 21/06*     (2013.01)

(56) References Cited

U.S. PATENT DOCUMENTS

| | | | | |
|---|---|---|---|---|
| 2004/0055447 | A1* | 3/2004 | Childs, Jr. | G10H 5/16 |
| | | | | 84/615 |
| 2005/0240396 | A1* | 10/2005 | Childs | G10H 1/0025 |
| | | | | 704/207 |
| 2015/0201889 | A1* | 7/2015 | Roginska | A61B 5/4064 |
| | | | | 600/407 |

OTHER PUBLICATIONS

Oded Ben-Tal et al., SONART : The Sonification Application Research Toolbox, Jul. 2-5, 2002, [Retrieved on Jul. 21, 2023]. Retrieved from the internet: <URL: https://d1wqtxts1xzle7.cloudfront.net/75327277/32_bental-libre.pdf?> 3 Pages (1-3) (Year: 2002).*

Zachary Kondak et al., Web Sonification Sandbox—an Easy-to-Use Web Application for Sonifying Data and Equations, Aug. 21-23, 2017, [Retrieved on Jul. 21, 2023]. Retrieved from the internet: <URL: https://qmro.qmul.ac.uk/xmlui/bitstream/handle/123456789/26083/24.pdf?sequence=1> 5 Pages (1-5) (Year: 2017).*

* cited by examiner

METHOD AND SYSTEM FOR THE SONIFICATION OF CONTINUOUS INTEGRATION (CI) DATA

CROSS REFERENCE TO RELATED APPLICATION

The present application claims the benefits of Ukraine Application No. a 2021 00692, filed Feb. 17, 2021, entitled "METHOD AND SYSTEM FOR THE SONIFICATION OF CONTINUOUS INTEGRATION (CI) DATA", which is incorporated herein by this reference in its entirety.

FIELD OF THE DISCLOSURE

Embodiments of the present disclosure relate generally to methods and systems for the sonification of continuous integration data in a continuous integration environment.

BACKGROUND

In computer programming/software development, Continuous Integration (CI) is the practice of building and testing each change in a codebase automatically and as early as possible. For example, each developer's working copy of a codebase is merged to a shared mainline several times a day. Continuous deployment may follow the testing that occurs during the continuous integration process, continuous deployment pushes the changes to a staging or production system. As can be appreciated, developers and the IT operations team are constantly collaborating in a CI environment to ensure that changes to the codebase do not break or interfere with other portions of the working code. Traditionally, a shared Graphical User Interface (GUI) visually presents changes and status information for the CI environment.

One issue with a visual presentation of the changes and status information for the CI environment is that the information is often complex and not all of the information may be readily presented or easily discernible merely from a visual inspection. Additionally, in current visual presentations, different icons (e.g., green, yellow, red, etc.) are used to summarize information about a given CI build job. For example, green may indicate a build job was generally successfully completed. In another example, red may indicate that the build job was generally unsuccessful. However, to obtain a more comprehensive (e.g., which tests failed, historical performance, etc.) a user/developer needs to click on the icon to obtain more detailed information about the job status and possible issues associated with the build job. Additionally, the user needs to proactively inspect the GUI to determine the status of a build job.

Sonification is the process of translating data into sound, which permits perception of data using hearing. Sonification uses non-speech audio to convey information and conceptualize data. Auditory perception includes characteristics such as, temporal, spatial, amplitude, and frequency that differ from visual perception. Sonification may be an alternative or complement to visual perception.

BRIEF SUMMARY

Embodiments of the present disclosure provide systems and methods for the sonification of continuous integration data in a continuous integration environment. According to one embodiment of the present disclosure, a method for the sonification of continuous integration data in the continuous integration environment includes receiving, by a processor, from a build server, a first set of continuous integration data for a build job in the continuous integration environment; converting, by the processor, the first set of continuous integration data into a first set of sonification data; applying, by the processor, at least one of toccata, legato, and/or arpeggio to the first set of sonification data; generating an audio file from the first set of sonification data; and publishing the generated audio file.

Aspects of the above method for the sonification of continuous integration data in a continuous integration environment include storing the generated audio file.

Aspects of the above method for the sonification of continuous integration data in a continuous integration environment wherein an increase in at least one of pitch, volume, or tempo indicates the build job was unsuccessful.

Aspects of the above method for the sonification of continuous integration data in a continuous integration environment include retrieving the published generated audio file; playing, via a user device, the published generated audio file, wherein the published generated audio file is outputted via a speaker in the user device or headphones connected to the user device; and displaying, by the processor, via a user interface in the user device, a visual representation of the generated audio file.

Aspects of the above method for the sonification of continuous integration data in a continuous integration environment wherein generating the audio file from the first set of sonification data comprises generating a MIDI file and converting the generated MIDI file to the audio file.

Aspects of the above method for the sonification of continuous integration data in a continuous integration environment include combining, by the processor, a plurality of sets of sonification data, wherein each set of the of the plurality of sets of sonification data is associated with a different build job of a plurality of build jobs, and wherein each set of sonification data of the plurality of sets of sonification data is represented by a different instrument of a plurality of instruments.

Aspects of the above method for the sonification of continuous integration data in a continuous integration environment include periodically polling, by the processor, the build server for updated continuous integration data for the build job; and in response to the updated continuous integration data being available: converting the updated continuous integration data into a second set of sonification data; applying, by the processor, at least one of toccata or arpeggio to the second set of sonification data generating an updated audio file from the first and second set of sonification data; and publishing the updated audio file.

Aspects of the above method for the sonification of continuous integration data in a continuous integration environment include detecting, by the processor, that updated continuous integration data is available on the build server for the build job; and in response to the updated continuous integration data being available: converting the updated continuous integration data into a second set of sonification data; applying, by the processor, at least one of toccata, legato, or arpeggio to the second set of sonification data; generating an updated audio file from the first and second set of sonification data; and publishing the updated audio file.

According to another embodiment of the present disclosure, a system comprises a processor and a memory storing instructions executable by the processor to receive from a build server, a first set of continuous integration data for a build job in a continuous integration environment; convert the first set of continuous integration data into a first set of sonification data; apply at least one of toccata or arpeggio to the first set of sonification data; generate an audio file from the first set of sonification data; and publish the generated audio file.

Aspects of the above system include further instructions executable by the processor to store the generated audio file.

Aspects of the above system wherein an increase in at least one of pitch, volume, or tempo indicates the build job was unsuccessful.

Aspects of the above system include further including: a user device configured to retrieve the published generated audio file; play the published generated audio file, wherein the published generated audio file is outputted via a speaker in the user device or via headphones connected to the user device; and display via a user interface, a visual representation of the generated audio file.

Aspects of the above system include further instructions executable by the processor to generate a MIDI file from the first set of sonification data; and convert the generated MIDI file to generate the audio file.

Aspects of the above system include further instructions executable by the processor to combine a plurality of sets of sonification data, wherein each set of the of the plurality of sets of sonification data is associated with a different build job of a plurality of build jobs, and wherein each set of sonification data of the plurality of sets of sonification data is represented by a different instrument of a plurality of instruments.

Aspects of the above system include further instructions executable by the processor to periodically poll the build server for updated continuous integration data for the build job; and in response to the updated continuous integration data being available: convert the updated continuous integration data into a second set of sonification data; apply at least one of toccata or arpeggio to the second set of sonification data; generate an updated audio file from the first and second set of sonification data; and publish the updated audio file.

Aspects of the above system include further instructions executable by the processor to detect that updated continuous integration data is available on the build server for the build job; and in response to the updated continuous integration data being available: convert the updated continuous integration data into a second set of sonification data; apply at least one of toccata, legato, or arpeggio to the second set of sonification data; generate an updated audio file from the first and second set of sonification data; and publish the updated audio file.

According to yet another embodiment of the present disclosure, a non-transitory computer-readable data storage medium storing instructions executable by a processor to receive from a build server, a first set of continuous integration data for a build job in a continuous integration environment; convert the first set of continuous integration data into a first set of sonification data; apply at least one of toccata or arpeggio to the first set of sonification data; generate an audio file from the first set of sonification data; and publish the generated audio file.

Aspects of the above non-transitory computer-readable data storage medium include further instructions executable by the processor to combine a plurality of generated audio files, wherein each audio file of the plurality of audio files is associated with a different build job of a plurality of build jobs, and wherein each audio file of the plurality of audio files is represented by a different instrument of a plurality of instruments.

Aspects of the above non-transitory computer-readable data storage medium include further instructions executable by the processor to periodically poll the build server for updated continuous integration data for the build job; and in response to the updated continuous integration data being available: convert the updated continuous integration data into a second set of sonification data; apply at least one of toccata or arpeggio to the second set of sonification data; generate an updated audio file from the first and second set of sonification data; and publish the updated audio file.

Aspects of the above non-transitory computer-readable data storage medium include further instructions executable by the processor to detect updated continuous integration data for the build job is available; and in response to the updated continuous integration data being available: convert the updated continuous integration data into a second set of sonification data; apply at least one of toccata or arpeggio to the second set of sonification data; generate an updated audio file from the first and second set of sonification data; and publish the updated audio file.

Aspects of the above non-transitory computer-readable data storage medium wherein an increase in at least one of pitch, volume, or tempo indicates the build job was unsuccessful.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides example embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the example embodiments will provide those skilled in the art with an enabling description for implementing an example embodiment. It should however be appreciated that the present disclosure may be practiced in a variety of ways beyond the specific detail set forth herein.

While the example aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Embodiments disclosed herein describe a method and system to provide a non-visual way of presenting information about a continuous integration build job in a continuous integration environment. Sonification presents one possible approach to representing Continuous Integration (CI) data. Advantageously, sonification does not require the visual attention of a user. Sonification can also provide a user with parallel perception (e.g., in tandem with visual data), which enables the discovery of correlations and the identification of trends/patterns within the data. Compared to a visual presentation, sonification provides a way for users to more easily consume/process large amounts of data, produced by different independent sources. Audio representation of CI data helps to encapsulate a large amount of information, and allows for better pattern recognition as perception of sound is different from perception/comprehension of visual information. Embodiments disclosed herein apply different techniques to the continuation integration data to avoid monotone/unpleasant sounds. More specifically, appealing melodies can be built by applying arpeggiation, toccata, and legato techniques. It may also be possible to broadcast an audio track to multiple users simultaneously, enabling a team to consume the same information at the same time to facilitate improved cooperation and alerting (e.g., integration with Jenkins CI™, MicroFocus PulseUno soundscape, etc.).

Sonification allows the health of a CI build to be presented in an audio format. First, a general determination if a build is health or unhealthy is made. If the build is unhealthy, a determination is made as to the degree to which the build job is unhealthy. For instance, in a visual representation each build job is represented with different icons to represent the build's behavior/health (e.g., very good, acceptable, unhealthy, very unhealthy, etc.). Rather than merely representing the build's behavior with an icon, the build's behavior (e.g., the number of tests that have been passed or failed by the build job) may be represented using audio (e.g., sonification). In other words, various characteristics of the build may be represented using different audio characteristics (e.g., volume, tone, pitch, tempo, etc.).

For example, when a build job is close to a baseline requirement/healthy then the volume of the audio file may be low (e.g., associated with a calming/relaxing tone), in contrast, when the job is unhealthy the volume may be higher. In another example, if a job fails every time, the pitch of the note corresponding to that job may tend to increase over time, to build an impression for the user that something is wrong. If the job passes sometimes and fails other times, then the pitch of that note may be left about the same. If the job is health (e.g., passes test most of the time) the pitch may decrease over time to create a calming impression. By changing sound parameters and/or using different music techniques, the user may be able to gather a general impression of the history/state of a build/job. Other sound parameters (e.g., pitch/frequency, tempo, spatial location, timbre, etc.) may be adjusted to represent a health of the job. In some embodiments each characteristic of a job/build may be represented with a different instrument. Additionally, or alternatively, each job/build may be represented with a different instrument, and the data for different job/builds (e.g., the different instruments) may be combined to produce an orchestral melody that represents the overall health of the combination of builds, with each build job corresponding to a different instrument. Additionally, or alternatively, a Music Instrument Digital Interface (MIDI) melody may be generated on the fly based on how all build jobs are performing, both currently and historically. In some examples, build jobs may be grouped by a particular computing platform.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably, and include any type of methodology, process, mathematical operation, or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Example hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
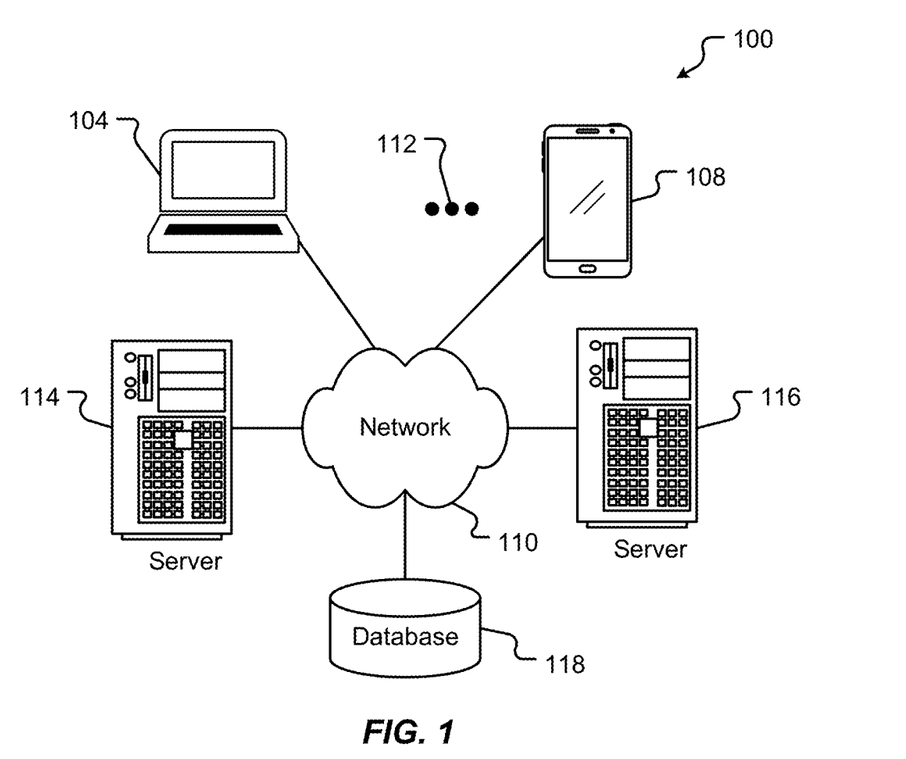
FIG. 1 is a block diagram illustrating elements of an example computing environment in which embodiments of the present disclosure may be implemented.

FIG. 1 is a block diagram illustrating elements of an example computing environment 100 in which embodiments of the present disclosure may be implemented. More specifically, this example illustrates a computing environment 100 that may function as the servers, user computers, or other systems provided and described herein. The environment 100 includes one or more user computers, or computing devices, such as a computer 104, a communication device 108, and/or more devices 112. The devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These device 104, 108, 112 may also have any of a variety of applications, including for example, database client and/or server applications, and web browser applications. Alternatively, the devices 104, 108, 112 may be any other electronic device, such as a thin-client computer, Internet-enabled mobile telephone, and/or personal digital assistant, capable of communicating via a network 110 and/or playing audio, displaying images, etc. Although the example computer environment 100 is shown with two devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. For example, the servers 114 and 116 may comprise build servers, which may be used to test and deploy builds in a continuous integration environment from the device 104, 108, 112. The servers 114 and 116 can be running an operating system including any of those discussed above, as well as any commercially available server operating systems. The servers 114 and 116 may also include one or more file and/or application servers, which can, in addition to an operating system, include one or more applications accessible by a client running on one or more of the devices 104, 108, 112. The server(s) 114 and/or 116 may be one or more general purpose computers capable of executing programs or scripts in response to the computers 104, 108, 112. As one example, the servers 114 and 116, may execute one or more builds. The builds may be implemented as one or more scripts or programs written in any programming language, such as Java™, C, C#®, or C++, and/or any scripting language, such as Perl, Python, or Tool Command Language (TCL), as well as combinations of any programming/scripting languages. The server(s) 114 and 116 may also include database servers, including without limitation those commercially available from Oracle®, Microsoft®, Sybase®, IBM® and the like, which can process requests from database clients running on the device 104, 108, 112.

The builds created and/or initiated by the device 104, 108, 112 (including builds created by other devices not illustrated) are shared to the build server 114 and/or 116, which then may test and/or deploy the builds generating continuous integration data related to the testing/deployment of the builds. The build server 114 and/or 116 may transfer the generated continuous integration data to a computing device to perform the sonification. Although for ease of description, FIG. 1 illustrates two servers 114 and 116, those skilled in the art will recognize that the functions described with respect to servers 114, 116 may be performed by a single server and/or a plurality of specialized servers, depending on implementation-specific needs and parameters. The computer systems 104, 108, 112, and servers 114 116 may function as the system, devices, or components described herein.

The environment 100 may also include a database 118. The database 118 may reside in a variety of locations. By way of example, database 118 may reside on a storage medium local to (and/or resident in) one or more of the computers/servers 104, 108, 112, 114, 116. Alternatively, it may be remote from any or all of the computers/servers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers/servers 104, 108, 112, 114, 116 may be stored locally on the respective computer/server and/or remotely, as appropriate. The database 118 may be used to store continuous integration data, sonification data, generated audio files, visual representations, etc.

Figure 2:
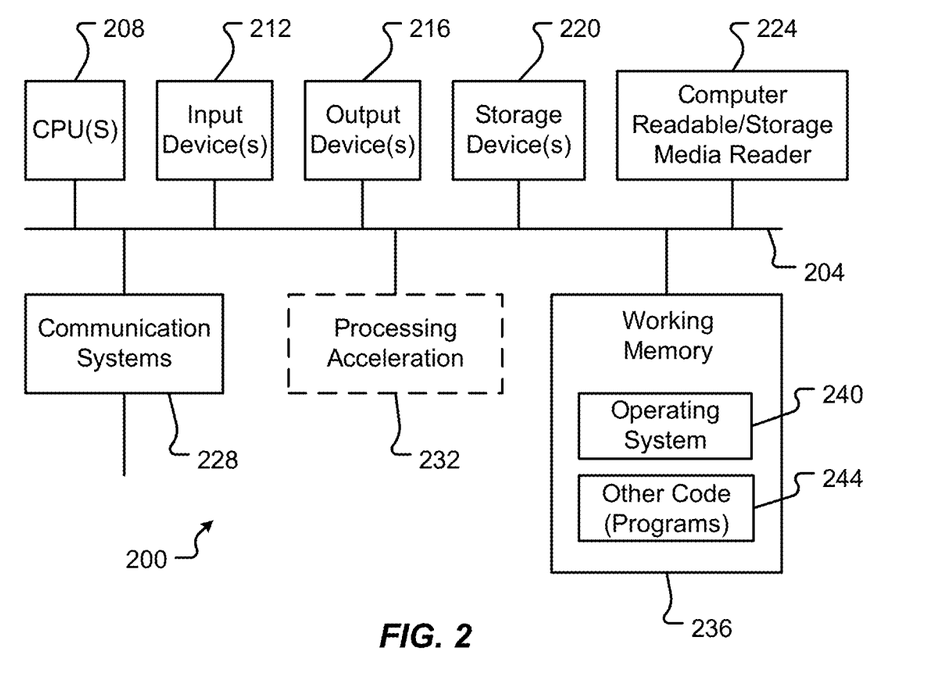
FIG. 2 is a block diagram illustrating elements of an example computing system in which embodiments of the present disclosure may be implemented.

FIG. 2 is a block diagram illustrating elements of an example computing system 200 in which embodiments of the present disclosure may be implemented. More specifically, this example illustrates one embodiment of a computer system 200 upon which the build servers, servers computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computers such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
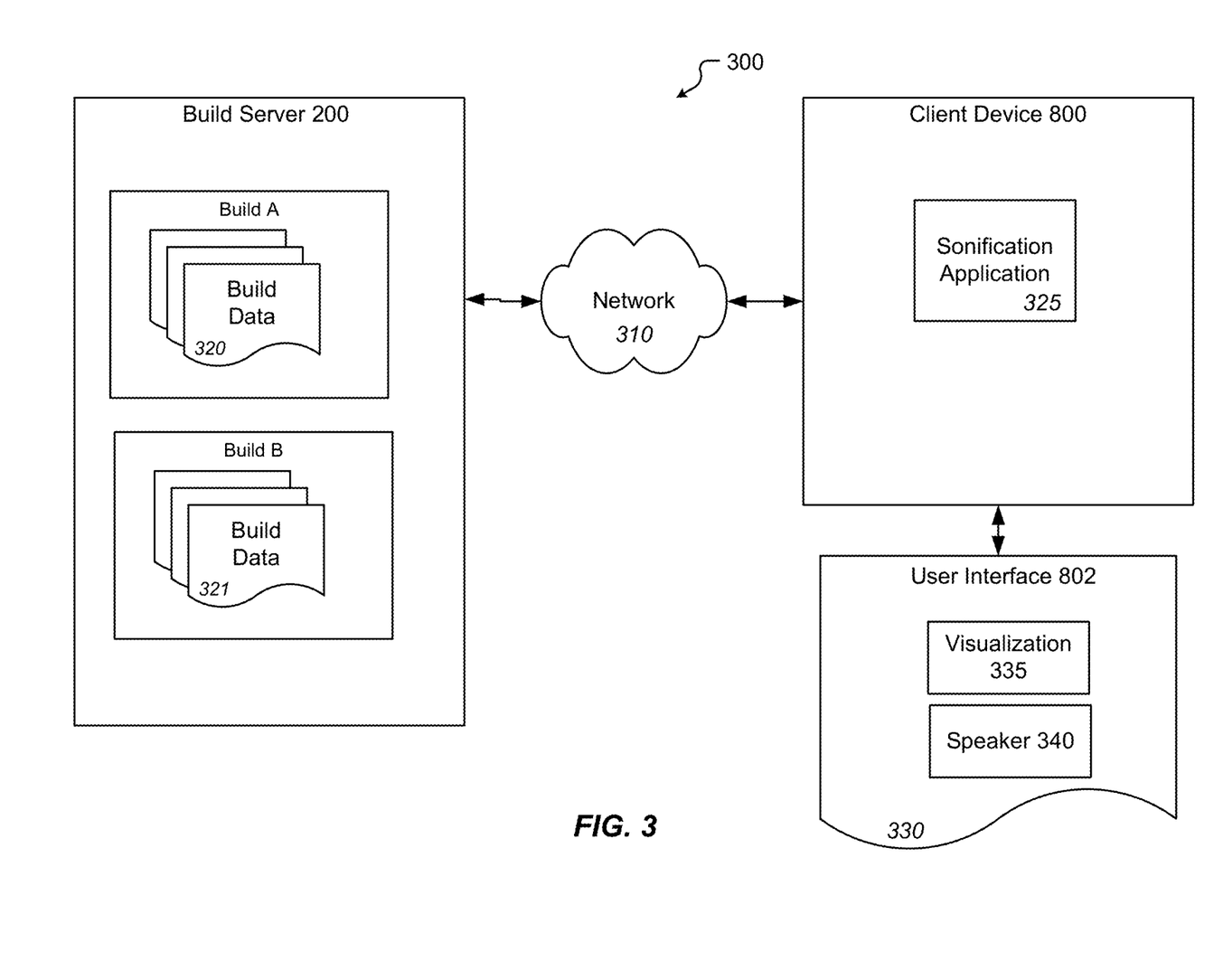
FIG. 3 is a block diagram illustrating an example environment for implementing resource sharing according to one embodiment of the present disclosure.

FIG. 3 is a block diagram illustrating an example environment for implementing sonification of continuous integration data according to one embodiment of the present disclosure. As illustrated in this example, the environment 300 can comprise a build server 200 such as described above communicatively coupled with one or more communication networks 310 including any one or more wired and/or wireless local and/or wide area networks as also described above. The environment 300 can also comprise a client device 800 communicatively coupled with the communications network(s) 310. The client device 800 can comprise any of a variety of computers such as described above.

Generally speaking, the build server 200 can maintain a set of jobs with multiple builds 320 provided by the client device 800 over the communication network(s) 310 as known in the art. Also as known in the art, the client device 800 can execute a sonification application 325 which can receive and render the continuous integration data via a user interface 330 (including visualization 335 and speaker 340). In some examples, speaker 340 may comprise headphones connected to client device 800.

Figure 4:
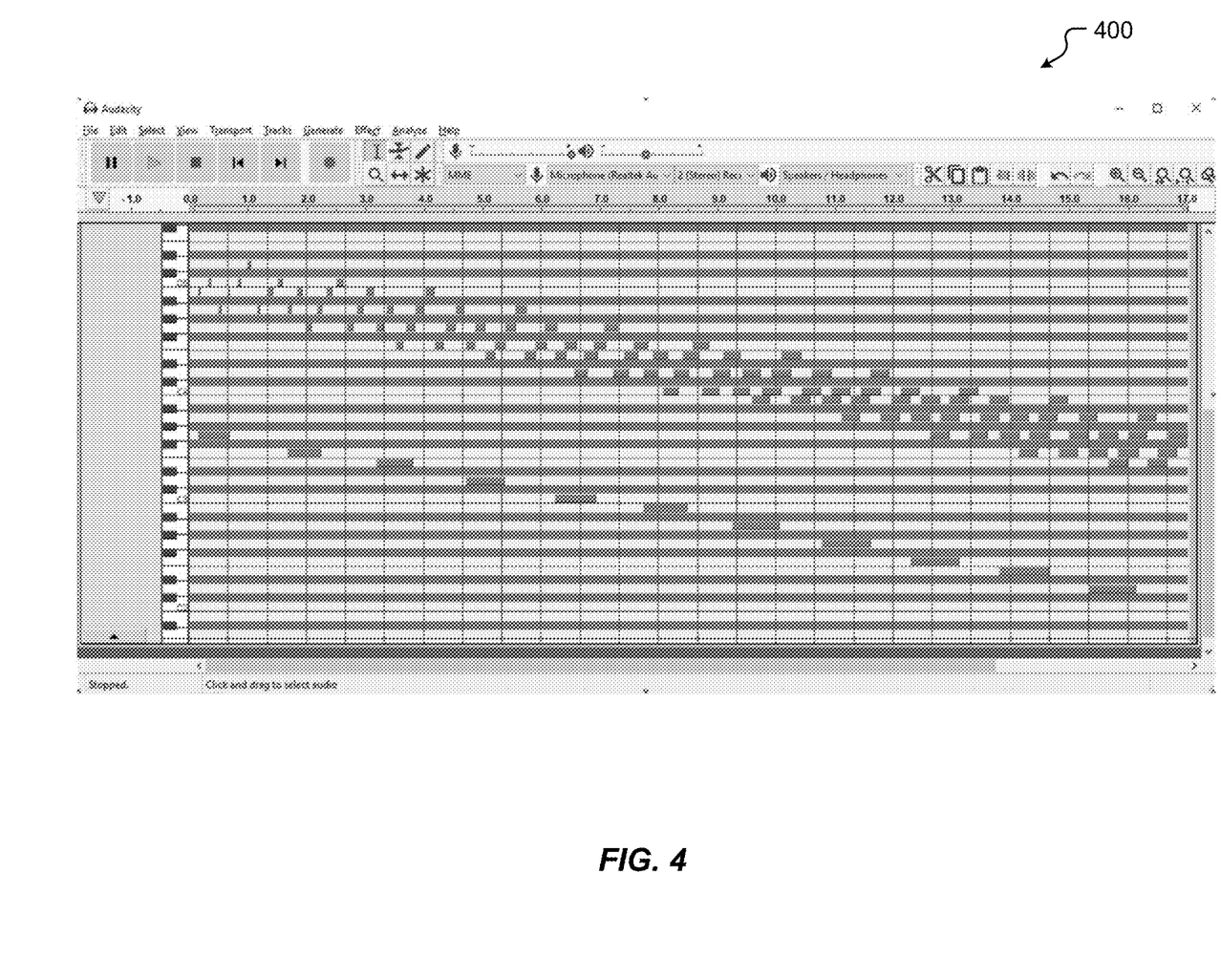
FIG. 4 is an example visual representation of a generated audio file for a healthy build according to one embodiment of the present disclosure.

FIG. 4 an example of a visual representation of a generated audio file for a successful build/job. As illustrated in FIG. 4, the notes have downward trend. In some embodiments, audio characteristics such as pitch, volume, or tempo may be used to indicate the health of a build job. For example, the sonification data associated with a successful build job may generate a more calm and pleasant melody compared to the sonification data associated with an unsuccessful build job.

The velocity of each note is adjusted to have an accented start of each arpeggio interval.

| i | ArpVelocity$_i$ |
|---|---|
| 0 | 1.00 |
| 1 | 1.00 |
| 2 | 1.00 |
| 3 | 0.95 |
| 4 | 0.90 |
| 5 | 0.85 |
| 6 | 0.80 |
| 7 | 0.75 |
| 8 | 0.70 |
| 9 | 1.00 |
| 10 | 1.00 |
| 11 | 1.00 |
| 12 | 0.95 |
| ... | ... |

Velocity$_0$=19
ΔVelocity=0.03
Velocity$_i$=Velocity$_0$−i*ΔVelocity*ArpVelocity$_i$
NoteVelocity$_i$=min (127, Velocity$_i$); where i=the sequential number of the note
NoteVelocity$_i$ is the velocity (volume) of the note i (with a maximum of 127)

Figure 5:
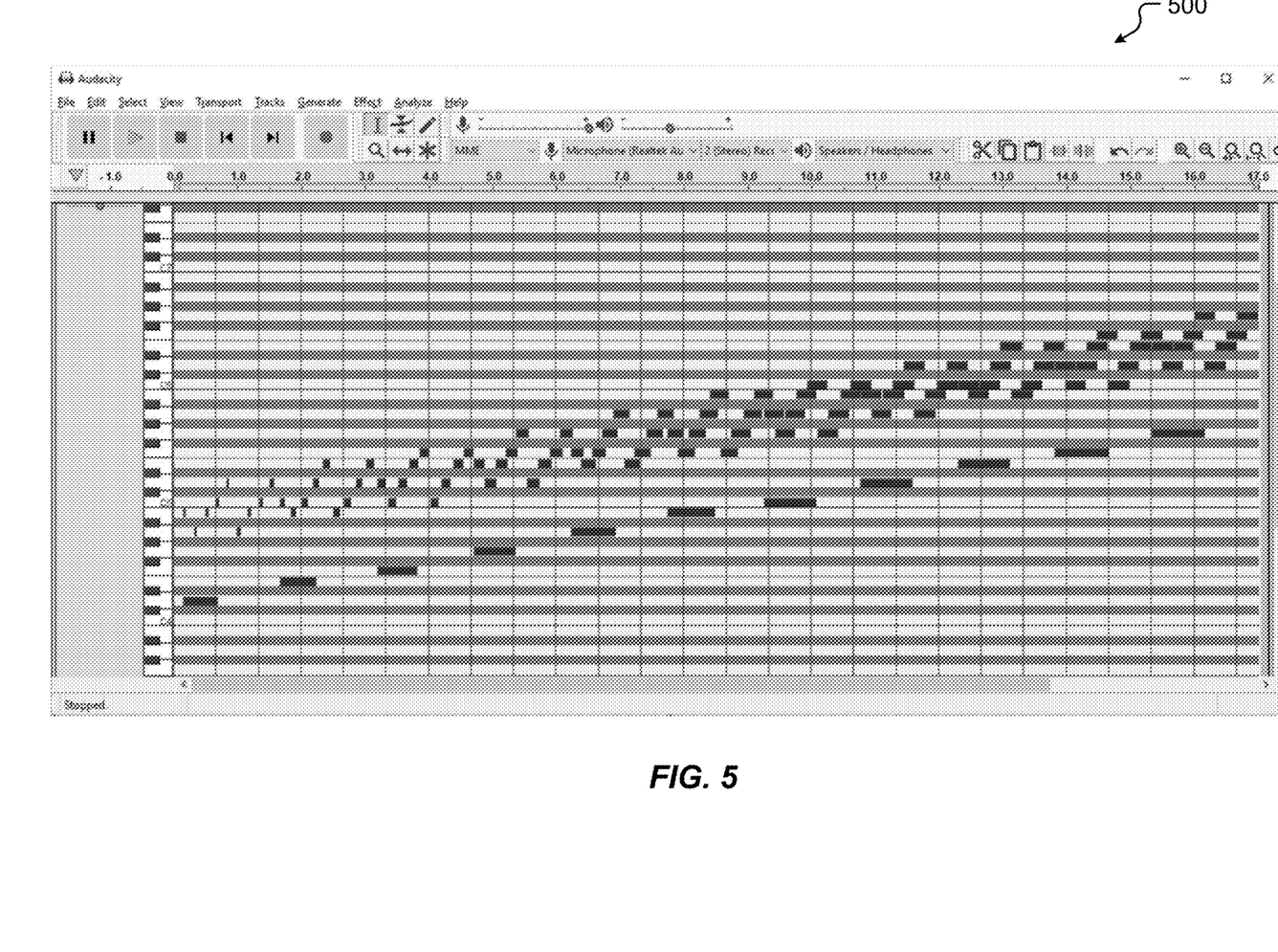
FIG. 5 is an example visual representation of a generated audio file for an unhealthy build according to one embodiment of the present disclosure.

FIG. 5 an example of a visual representation of a generated audio file for an unsuccessful/unhealthy build/job. As illustrated, in FIG. 5, the notes have an upward trend (indicated an increase in pitch). In other examples, an increase in at least one of pitch, volume, or tempo indicates the build job was unsuccessful.

To compose the toccata musical form, producing the impression of moving from past to present, the following formulas are used to calculate the start time and duration of each not. In addition, some variation is added to make sure the resulting audio is not so "mathematical."

NoteStartTime$_i$=i+RND(θ, StartTimeVariation); the time when the note i starts to play in beats NoteDuration$_i$=Duration$_i$+RND(θ, DurationVariation); the duration of the note i in beats (max=2 beats)

Duration$_i$=Duration$_0$+i*ΔDuration

Where:

StartTimeVariation=0.02

DurationVariation=0.05

ΔDuration=0.03

Duration$_0$=0.2

Where RND produces a random value from a given interval with normal distribution.

Figure 6:
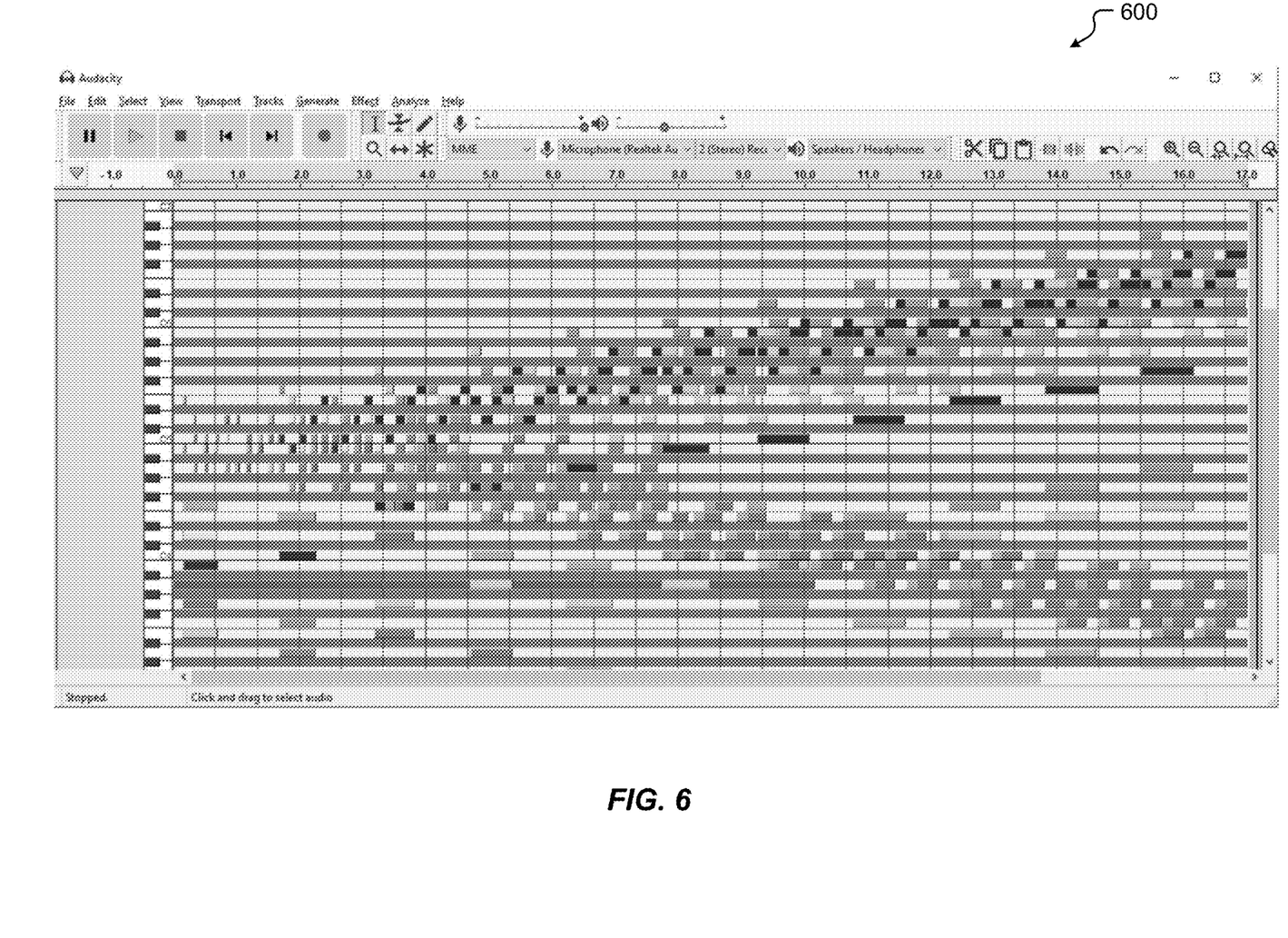
FIG. 6 is another example visual representation of a combined audio file for multiple jobs according to one embodiment of the present disclosure.

FIG. 6 an example of a visual representation of a combined audio file combining the sonification data for multiple jobs/build. Each job/build is represented with a different color (e.g., instrument) to generate an orchestral audio file.

Figure 7:
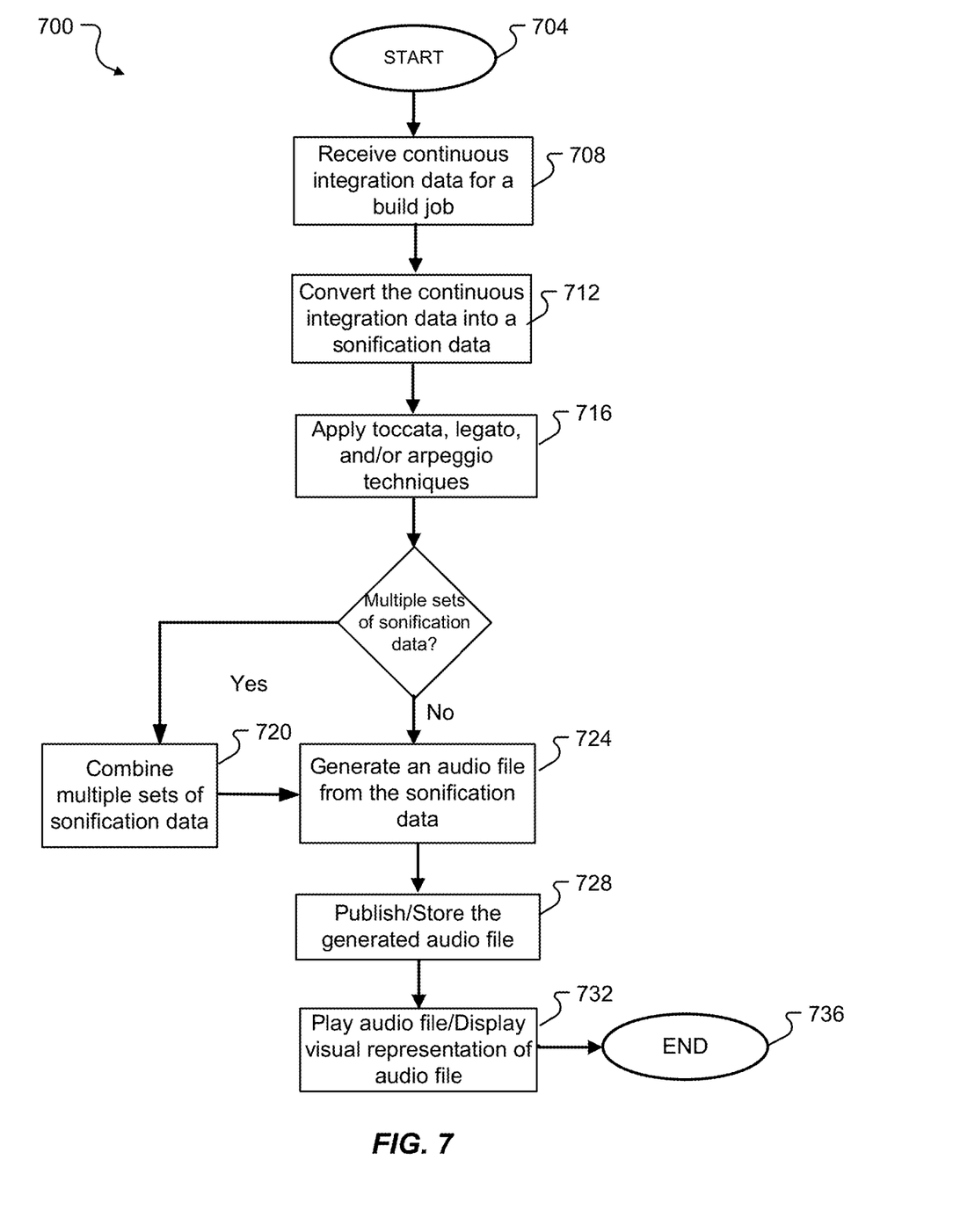
FIG. 7 flowchart illustrating an example process for the sonification of continuous integration data according to one embodiment of the present disclosure.

FIG. 7 is a flowchart illustrating an example process 700 for the sonification of continuous integration data in a continuous integration environment according to one embodiment of the present disclosure. While a general order for the steps of the process 700 for the operation of the sonification of continuous integration data is shown in FIG. 7, the process 700 can include more or fewer steps or can arrange the order of the steps differently than those shown in FIG. 7. Further, two or more steps may be combined into one step. Generally, the process 700 starts with a START operation 704 and ends with an END operation 736.

The process 700 can be executed on a set of computer-executable instructions executed by a data processing system and encoded or stored on a computer readable medium. Herein, the process 700 shall be explained with reference to systems and components, modules, software, data structures, user interfaces, etc. described above. Moreover, process 700 can be implemented as a non-transitory computer-readable data storage medium storing instructions that a processor executes. Process 700 is described in relation to the example implementations 400, 500, and 600 illustrated in FIGS. 4-6 for descriptive clarity but is applicable to other types of architectures as well.

Process 700 may start at START operation 704 and proceed to step 708 where the processor receives, from a build server, a first set of continuous integration data for a build job in the continuous integration environment. After receiving the continuous integration data at step 708, process 700 proceeds to step 712 where the processor converts the first set of continuous integration data into a first set of sonification data. After converting the continuous integration into the sonification data at step 712, process 700 proceeds to step 716 where the processor applies toccata, legato, and/or arpeggio techniques to the sonification data. After applying toccata, legato, and/or arpeggio techniques to the first set of sonification data at step 716, process 700 determines whether there are multiple sets of sonification data, if there are multiple sets of sonification data (Yes), proceeds to step 720 where the processor combines the multiple sets of sonification data. In some embodiments, each set of sonification data is associated with a different build job, and each set of sonification data is represented by a different instrument, such that when the different sets of sonification data are combined and the audio file is generated from the combined sets of sonification data, the resulting audio file sounds like an orchestra playing. After the multiple sets of sonification data are combined, process 700 proceeds to step 724. In some embodiments, the multiple sets of sonification data are separately processed and the separately generated audio files are combined. If there is not multiple sets of sonification data (No), process 700 proceeds to step 724 where the processor generates an audio file from the one or more sets of sonification data. After generating the audio file at step 724, the process 700 proceeds to step 728 where the generated audio file is published and/or stored. Additionally, in some embodiments, after the generated audio file is published/stored at step 728, the process 700 proceeds to step 732 where a user device plays the audio file and/or displays a visual representation of the audio file (e.g., the notes associated with the audio file). In some embodiments, the visual representation is aminated, such that as the audio file is played, an indicator moves over the visual representation of the notes of the audio file. The process 700 ends at END operation 736.

Additionally, in some embodiments, the build server may be periodically polled for the continuous integration data, and the audio file is updated as needed based on updated continuous integration data. In other examples, information (e.g., event data in a subscriber-publisher model) is received from the build server that new continuous integration data is available for one or more builds, and the new continuous integration data is retrieved in response. Additionally, the polling and event drive approach may be used in combination. For example, each time a build is deployed after testing, the new continuous integration data is pushed to the computing system performing the sonification.

Figure 8:
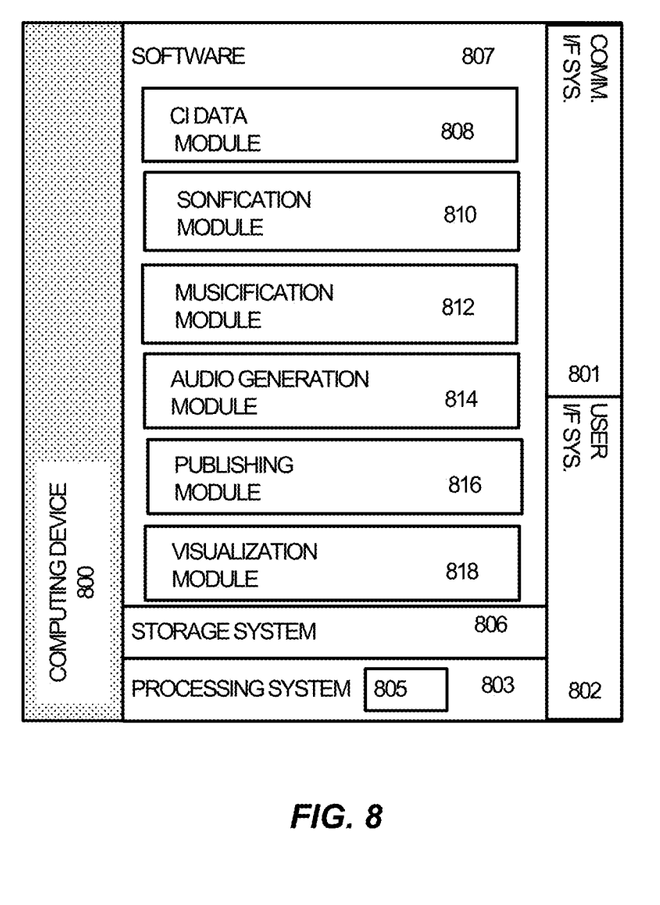
FIG. 8 is a block diagram illustrating an example computing device for the sonification of continuous integration data according to one embodiment of the present disclosure.

FIG. 8 depicts a computing device 800 in accordance with embodiments of the present disclosure. The computing device 800 performs the sonification of continuous integration data in continuous integration environment. The computing device 800 receives continuous integration data for a build job in the continuous integration environment. For example, the computing device 800 may receive the continuous integration data 320 from the build server 200. The computing device 800 converts the received continuous integration data into sonification data. For example, the computing device 800 applies at least one of toccata or arpeggio techniques to the continuous integration data to generate the sonification data. The computing device 800 may store the generated audio file in storage system 806 and/or play the audio file via the user interface system 802 (e.g., a speaker or headphones connected to computing device 800). The computing device 800 may also display to the user, via the user interface 802, a visual representation of the generated audio file. Similar computing systems may be included in devices 104, 108, and 112, in whole or in part, described herein to perform the sonification of continuous integration data in a continuous integration environment.

A computing system 800 is representative of any computing system or systems with which the various operational architectures, processes, scenarios, and sequences disclosed herein to perform the sonification of continuous integration data in a continuous integration environment, comprising various components and connections to other components and/or systems.

The computing system 800 comprises a communication interface 801, a user interface system 802, and a processing system 803. The processing system 803 is linked to the communication interface 801 and user interface system 802. The processing system 803 includes a microprocessor and/or processing circuitry 805 and a storage system 806 that stores operating software 807. The computing system 800 may include other well-known components such as a battery and enclosure that are not shown for clarity. The computing system 800 may comprise a server, a user device, a desktop computer, a laptop computer, a tablet computing device, or some other user communication apparatus.

The communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In some implementations, the communication interface 801 is configured to communicate with other devices, wherein the communication interface 801 is used to receive the continuous integration data from a build server.

The user interface system 802 comprises components that interact with a user to present media and/information (e.g., audio files, visual representations, etc.), and receive input from a user. The user interface system 802 may include a speaker, microphone, buttons, lights, display screen, touch screen, touch pad, scroll wheel, communication port, or some other user input/output apparatus—including combinations thereof.

The processing circuitry 805 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via a bus, executes instructions, and outputs data, again such as via the bus. In other embodiments, the processing circuitry 805 may comprise a shared processing device that may be utilized by other processes and/or process owners, such as in a processing array or distributed processing system (e.g., "cloud," farm, etc.). It should be appreciated that the processing circuitry 805 is a non-transitory computing device (e.g., electronic machine comprising circuitry and connections to communicate with other components and devices). The processing circuitry 805 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor and the hardware and other circuitry thereof.

The processing circuitry 805 comprises a microprocessor and other circuitry that retrieves and executes the operating software 807 from the storage system 806. The storage system 806 may include volatile and nonvolatile, removable, and non-removable media implemented in any method or technology for storage of information, such as computer readable instructions, data structures, program modules, or other data. The storage system 806 may be implemented as a single storage device, but may also be implemented across multiple storage devices or sub-systems. The storage system 806 may comprise additional elements, such as a controller to read the operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 805 is typically mounted on a circuit board that may also hold the storage system 806 and portions of the communication interface 801 and the user interface 802. The operating software 807 comprises computer programs, firmware, or some other form of machine-readable program instructions. The operating software 807 includes a continuous integration (CI) data module 808, a sonification module 810, musicification module 812, an audio generation module 814, a publishing module 816, and a visualization module 818, although any number of software modules within the application may provide the same operation. The operating software 807 may further include an operating system, utilities, drivers, network interfaces, applications, or some other type of software. When executed by the processing circuitry 805, the operating software 807 directs the processing system 803 to operate the computing device 800 as described herein.

In at least one implementation, the continuous integration data module 808, when read and executed by the processing system 803, directs the processing system 803 to receive/request/monitor for the continuous integration data from the build server. For example, the build server may automatically push the continuous integration data to the computing device 800 when a build is deployed and/or initiated (e.g., transfer event data). In other examples, the computing device 800 may periodically poll the build server for the continuous integration data (e.g., at intervals configurable by a user). The sonification module 810 when read and executed by the processing system 803, directs the processing system 803 to perform sonification on the continuous integration data (e.g., generate the sonification data). Musicification module 812 applies techniques such as, but not limited to, toccata, legato, and/or arpeggio to the sonification data. The audio generation module 814, when read and executed by the processing system 803, directs the processing system 803 to generate an audio file (e.g., MIDI, .wav, .mp3, etc.) using the sonification data. The publishing module 816, when read and executed by the processing system 803, directs the processing system 803 to publish and/or store the generated audio file. For example, once the generated audio file is published to a server, users may play the generated audio file on their own devices (e.g., computer, laptop, smartphone, tablet, etc.) The visualization module 818, when read and executed by the processing system 803, directs the processing system 803 to generate a visual representation of the generated audio file, examples shown in FIGS. 4-6.

It should be appreciated that computer readable data may be sent, received, stored, processed, and presented by a variety of components. It should also be appreciated that components illustrated may control other components, whether illustrated herein or otherwise.

Ones of ordinary skill in the art will appreciate that other communication equipment may be utilized, in addition or as an alternative, to those described herein without departing from the scope of the embodiments.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for sonification of continuous integration data in a continuous integration environment, the method comprising:
    receiving, by a processor, from a build server, a plurality of sets of continuous integration data, wherein each set of continuous integration data corresponds to a different build job in the continuous integration environment;
    converting, by the processor, the plurality of sets of continuous integration data into a plurality of sets of sonification data;
    applying, by the processor, at least one of toccata, legato, or arpeggio to the plurality of sets of sonification data;
    combining, by the processor, the plurality of sets of sonification data, wherein each set of the plurality of sets of sonification data is represented by a different instrument of a plurality of instruments;
    generating an audio file from the plurality of sets of sonification data; and
    publishing the generated audio file via a communication network.

2. The method according to claim 1, further comprising: storing the generated audio file.

3. The method according to claim 1, wherein an increase in at least one of pitch, volume, or tempo indicates the build job was unsuccessful.

4. The method according to claim 1, further comprising:
    retrieving the published generated audio file;
    playing, via a user device, the published generated audio file, wherein the published generated audio file is outputted via a speaker in the user device or headphones connected to the user device; and
    displaying, via a user interface in the user device, a visual representation of the published generated audio file.

5. The method according to claim 1, wherein generating the audio file from the plurality of sets of sonification data comprises generating a MIDI file and converting the generated MIDI file to the audio file.

6. The method according to claim 1, further comprising:
    periodically polling, by the processor, the build server for updated continuous integration data for the build job; and
    in response to the updated continuous integration data being available:
    converting the updated continuous integration data into a second set of sonification data;
    applying, by the processor, at least one of toccata, legato, or arpeggio to the second set of sonification data;
    generating an updated audio file from a first set and the second set of sonification data; and
    publishing the updated audio file.

7. The method according to claim 1, further comprising:
    detecting, by the processor, that updated continuous integration data is available on the build server for the build job; and
    in response to the updated continuous integration data being available:
        converting the updated continuous integration data into a second set of sonification data;
        applying, by the processor, at least one of toccata, legato, or arpeggio to the second set of sonification data;
        generating an updated audio file from a first set and the second set of sonification data; and
        publishing the updated audio file.

8. The method according to claim 1, wherein sounds parameters such as pitch/frequency, tempo, spatial location, and timbre may be associated with build job characteristics and may be adjusted to represent changes in the build job characteristics.

9. A system, comprising:
    a processor; and
    a memory storing instructions executable by the processor to cause the processor to:
        receive from a build server, a plurality of sets of continuous integration data, wherein each set of continuous integration data is associated with a different build job in a continuous integration environment;
        convert the plurality of sets of continuous integration data into a plurality of sets of sonification data;
        apply at least one of toccata, legato, or arpeggio to the plurality of sets of sonification data;
        combine the plurality of sets of sonification data, wherein each set of the plurality of sets of sonification data is represented by a different instrument of a plurality of instruments;
        generate an audio file from the plurality of sets of sonification data; and
        publish the generated audio file.

10. The system according to claim 9, wherein the instructions executable by the processor further cause the processor to:
store the generated audio file.

11. The system according to claim 9, wherein an increase in at least one of pitch, volume, or tempo indicates the build job was unsuccessful.

12. The system according to claim 9, further comprising:
a user device configured to:
retrieve the published generated audio file;
play the published generated audio file, wherein the published generated audio file is outputted via a speaker in the user device or via headphones connected to the user device; and
display via a user interface, a visual representation of the published generated audio file.

13. The system according to claim 9, wherein the instructions executable by the processor further cause the processor to:
generate a MIDI file from a first set of sonification data; and
convert the generated MIDI file to generate the audio file.

14. The system according to claim 9, wherein the instructions executable by the processor further cause the processor to:
periodically poll the build server for updated continuous integration data for the build job; and
in response to the updated continuous integration data being available:
convert the updated continuous integration data into a second set of sonification data;
apply at least one of toccata, legato, or arpeggio to the second set of sonification data;
generate an updated audio file from a first set and the second set of sonification data; and
publish the updated audio file.

15. The system according to claim 9, wherein the instructions executable by the processor further cause the processor to:
detect that updated continuous integration data is available on the build server for the build job; and
in response to the updated continuous integration data being available:
convert the updated continuous integration data into a second set of sonification data;
apply at least one of toccata, legato, or arpeggio to the second set of sonification data;
generating an updated audio file from a first set and the second set of sonification data; and
publish the updated audio file.

16. The system according to claim 9, wherein sounds parameters such as pitch/frequency, tempo, spatial location, and timbre may be associated with build job characteristics and may be adjusted to represent changes in the build job characteristics.

17. A non-transitory computer-readable data storage medium storing instructions executable by a processor to:
receive from a build server, a plurality of sets of continuous integration data, wherein each set of continuous integration data is associated with a different build job in a continuous integration environment;
convert the plurality of sets of continuous integration data into a plurality of sets of sonification data;
apply at least one of toccata, legato, or arpeggio to the plurality of sets of sonification data;
combine the plurality of sets of sonification data, wherein each set of the plurality of sets of sonification data is represented by a different instrument of a plurality of instruments;
generate an audio file from the plurality of sets of sonification data; and
publish the generated audio file.

18. The non-transitory computer-readable data storage medium according to claim 17, wherein further instructions are executable by the processor to:
periodically poll the build server for updated continuous integration data for the build job; and
in response to the updated continuous integration data being available:
convert the updated continuous integration data into a second set of sonification data;
generate an updated audio file from a first set and the second set of sonification data; and
publish the updated audio file.

19. The non-transitory computer-readable data storage medium according to claim 17, wherein further instructions are executable by the processor to:
detect that updated continuous integration data is available on the build server for the build job; and
in response to the updated continuous integration data being available:
convert the updated continuous integration data into a second set of sonification data;
apply at least one of toccata, legato, or arpeggio to the second set of sonification data;
generating an updated audio file from a first set and the second set of sonification data; and
publish the updated audio file.

20. The non-transitory computer-readable data storage medium according to claim 17, wherein sounds parameters such as pitch/frequency, tempo, spatial location, and timbre may be associated with build job characteristics and may be adjusted to represent changes in the build job characteristics.

* * * * *